(12) United States Patent
Xu et al.

(10) Patent No.: US 12,438,442 B1
(45) Date of Patent: Oct. 7, 2025

(54) ACTIVE VARIABLE INDUCTOR CIRCUIT

(71) Applicant: Hong Kong Applied Science and Technology Research Institute Company Limited, Hong Kong (HK)

(72) Inventors: Danting Xu, Hong Kong (HK); Yue Ma, Hong Kong (HK); Chengyong Li, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 0 days.

(21) Appl. No.: 18/923,891

(22) Filed: Oct. 23, 2024

(51) Int. Cl.
| | | |
|---|---|---|
| *H02M 1/14* | (2006.01) | |
| *H02M 1/15* | (2006.01) | |
| *H02M 3/156* | (2006.01) | |
| *H02M 3/158* | (2006.01) | |

(52) U.S. Cl.
CPC .............. *H02M 1/14* (2013.01); *H02M 1/143* (2013.01); *H02M 1/15* (2013.01); *H02M 3/1566* (2021.05); *H02M 3/158* (2013.01); *H02M 3/1588* (2013.01)

(58) Field of Classification Search
CPC .......... H02M 1/14; H02M 1/143; H02M 1/15; H02M 3/156; H02M 3/158; H02M 3/1588
See application file for complete search history.

(56) References Cited

U.S. PATENT DOCUMENTS

| | | | | | |
|---|---|---|---|---|---|
| 5,134,355 | A | * | 7/1992 | Hastings | H02M 1/4208 323/224 |
| 5,418,709 | A | * | 5/1995 | Lukemire | H02M 3/155 323/222 |
| 5,583,424 | A | * | 12/1996 | Sato | G05F 1/575 336/200 |

(Continued)

FOREIGN PATENT DOCUMENTS

| | | |
|---|---|---|
| CN | 101534047 A | 9/2009 |
| JP | H10172840 A | 6/1998 |

(Continued)

OTHER PUBLICATIONS

ISR and Written Opinion, PCT/CN2024/128494, Jul. 18, 2025.

(Continued)

*Primary Examiner* — Gary L Laxton
(74) *Attorney, Agent, or Firm* — Stuart T. Auvinen; g Patent LLC

(57) ABSTRACT

A Switched-Mode Power Supply uses a primary winding of a transformer rather than an inductor. The secondary winding of the transformer is driven with a current generated by a negative inductance circuit. When the reverse current flows it can increase the equivalent inductance value of the primary windings. A steady-state detector activates a steady signal and closes a switch to turn on the reverse current from an op amp when the output voltage remains within predetermined limits, causing the inductance to increase thus reducing ripple during steady state. When an output transient occurs, the steady signal is deactivated and the switch (Continued)

opened to stop the current from flowing through the transformer secondary, reducing primary inductance to allow for current to flow faster to the output to suppress the transient. Resistor and capacitor networks around the op amp allow for tuning the inductance modulation.

20 Claims, 15 Drawing Sheets

(56) References Cited

U.S. PATENT DOCUMENTS

| | | | |
|---|---|---|---|
| 5,602,464 A * | 2/1997 | Linkowsky | G05F 3/22 |
| | | | 323/224 |
| 6,140,808 A | 10/2000 | Massie | |
| 7,233,130 B1 * | 6/2007 | Kay | H02M 1/143 |
| | | | 323/284 |
| 7,251,113 B1 | 7/2007 | Batarseh et al. | |
| 8,441,242 B2 | 5/2013 | Ng et al. | |
| 10,680,521 B1 * | 6/2020 | Bertolini | H02M 1/15 |
| 11,329,560 B2 | 5/2022 | Onozaki | |
| 2020/0412248 A1 * | 12/2020 | Onozaki | H02M 3/158 |
| 2023/0016789 A1 | 1/2023 | Barry | |
| 2024/0030804 A1 | 1/2024 | Nishimoto | |
| 2024/0154517 A1 | 5/2024 | Lin et al. | |

FOREIGN PATENT DOCUMENTS

| | | |
|---|---|---|
| JP | 2005168157 A | 6/2005 |
| JP | 2016163381 A | 9/2016 |
| WO | WO 2006115223 A | 12/2008 |

OTHER PUBLICATIONS

Cheng et al. "Fast-transient techniques for high-frequency DC-DC converters", Journal of Semiconductors, (2020) 41, 112402, 2020.

Osama Abdel-Rahman et al., "Transient Response Improvement in DC-DC Converters Using Output Capacitor Current for Faster Transient Detection", PESC Record—IEEE Annual Power Electronics Specialists Conference, pp. 157-160, Jul. 2007.

Mengyuan Sun et al., "A Fast Transient Adaptive On-Time Controlled BUCK Converter with Dual Modulation", Micromachines 2023, 14, 1868, Sep. 2023.

* cited by examiner

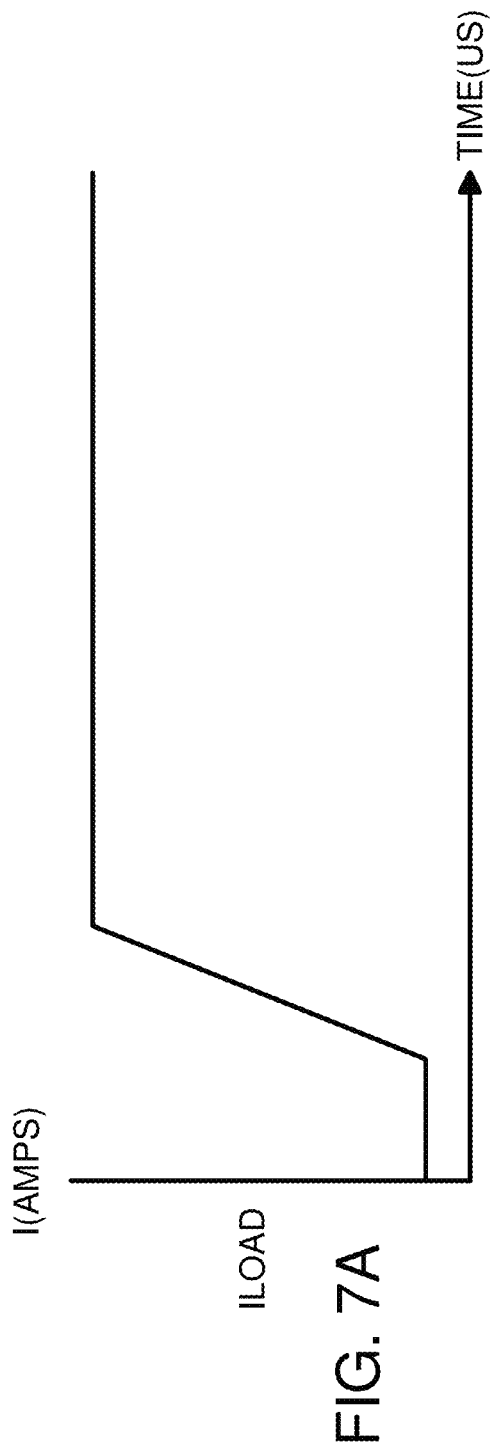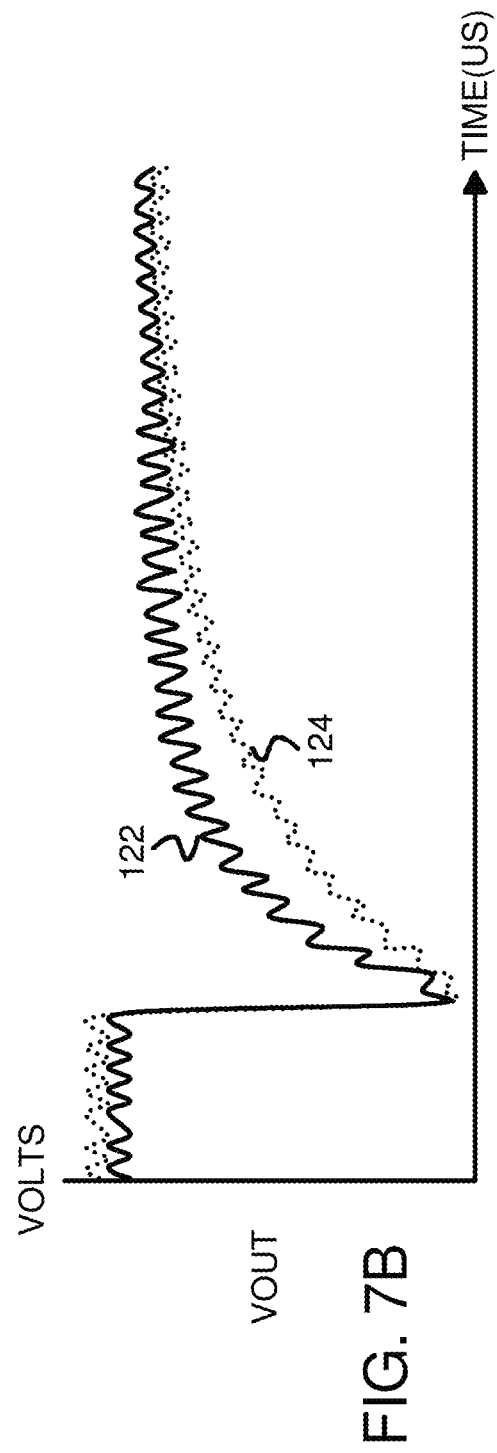

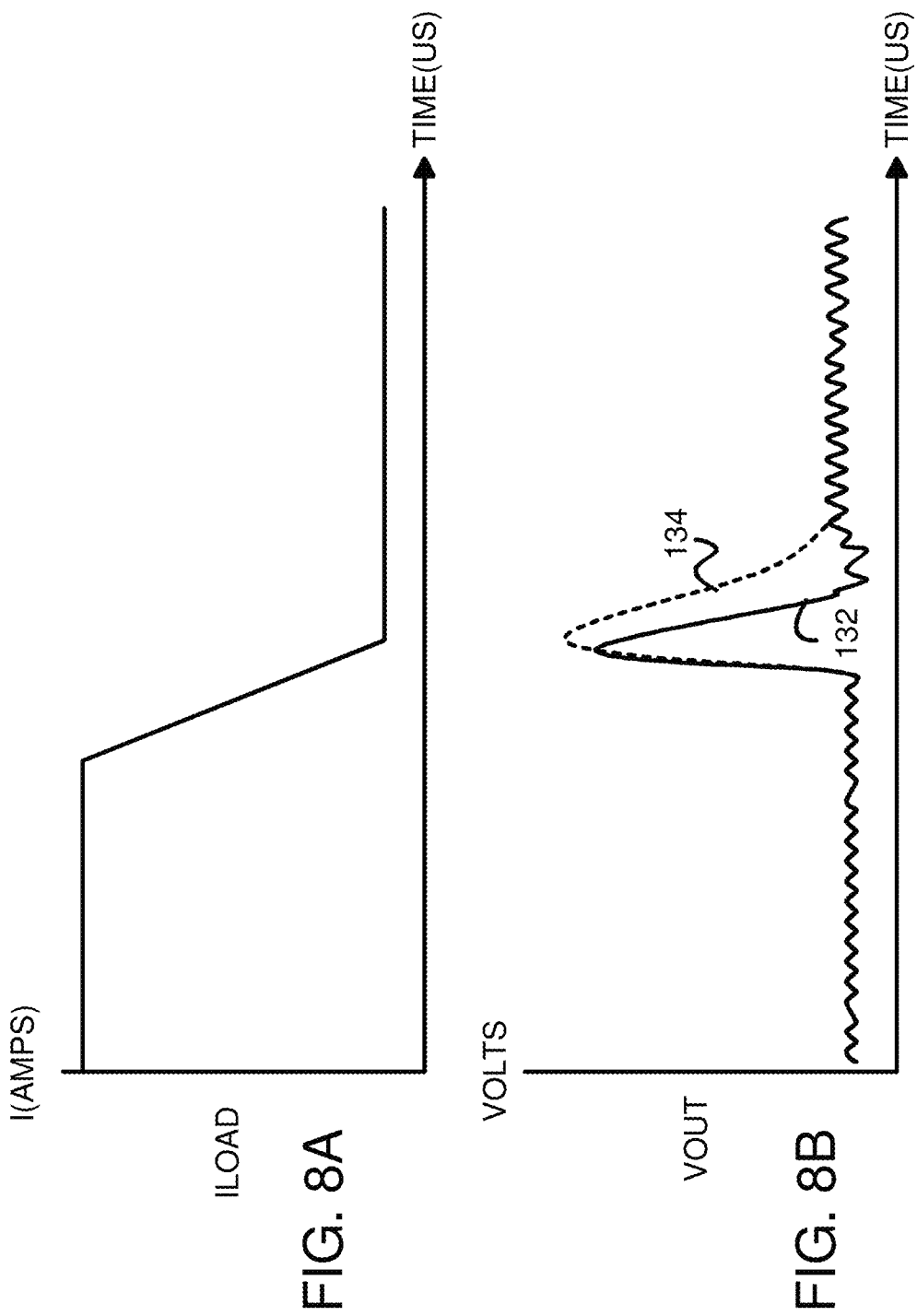

ACTIVE VARIABLE INDUCTOR CIRCUIT

FIELD OF THE INVENTION

This invention relates to active inductors, and more particularly to a negative inductance circuit for a Switched-Mode Power Supply (SMPS).

BACKGROUND OF THE INVENTION

Power Metal Oxide Semiconductor Field Effect Transistors (MOSFETs) that switch in the hundred kHz range have enabled light, small, and efficient Switched-Mode Power Supplies (SMPS). A typical SMPS uses two power transistors in a Buck converter arrangement. The gates of the power transistors are switched on and off by a controller than ensures that both transistors are not on at the same time. By controlling the duty cycles and other timing, a desired output voltage can be generated from an input voltage.

FIG. 1 shows a prior-art SMPS. The SMPS converts input voltage VIN to output voltage VOUT that drives a load represented by load resistor 18. Controller 12 drives gate signal S1 high to turn on transistor 22 to allow current to flow from VIN, through transistor 22 and inductor 10 to charge output capacitor 16. Then controller 12 turn off S1 and turn on gate signal S2, which turns on transistor 24, discharging output capacitor 16. The ON times for S1 and S2 generated by controller 12 determine the output voltage VOUT that is sustained in steady-state for a given value of VIN and device sizes.

Input capacitor 14 smooths VIN, while output capacitor 16 stores charge and smooths ripples on VOUT. Inductor 10 stores energy in its magnetic field and smooths variations in inductor current IL that drives VOUT and supplies capacitor current IC to charge output capacitor 16.

FIG. 2 is a waveform showing operation of the SMPS of FIG. 1. When controller drives S1 high, VIN drives current through transistor 22 and inductor 10. The voltage across inductor 10, VL, rises and falls as S1 turns transistor 22 on and off. This voltage VL causes inductor current IL to rise sharply during S1 high, and fall slowly when S1 is low. Energy is stored in inductor 10 when IL rises, and is released as IL falls.

The AC portion of inductor current IL flows mostly to output capacitor 16, causing capacitor current IC to follow inductor current IL, but with curvature due to the RC delay. The voltage across output capacitor 16, and VOUT, rises and falls with inductor current IL, after an RC delay.

The rising and falling of VOUT is known as ripple, and is undesirable. Ripple can be reduced by increasing the capacitance value (measured in Farads) of output capacitor 16. However, this is undesirable singe large capacitors occupy board or layout space and can be expensive and have long wiring paths that have electrical losses. Ripple can also be reduced by increasing the inductance value (measured in Henrys) of inductor 10, but again large inductors tend to be even more expensive and cumbersome than capacitors.

Increasing the capacitance or inductance also reduces the transient response of the SMPS. For example, the load may contain many transistors or other circuits that are switched on and off during normal operation. This can cause the current drawn by the load to vary. The SMPS should respond to these load current variations by supplying additional or reduced current as needed. However, when output capacitor 16 is large, the current through transistor 22 is applied to charge output capacitor 16 rather than flow through load resistor 18. Likewise a larger inductor 10 also has a poor transient response. When transient response is weak, VOUT can swing to extreme levels that can trigger over-voltage or under-voltage protection circuits, which is undesirable.

There is a trade-off between increasing output capacitance and inductance to reduce ripple, while still providing enough transient response. The inventors realize that reducing output ripple and improving transient response are mutually exclusive when traditional fixed-value capacitor and inductors are used in the SMPS.

What is desired is an active inductor for use in an SMPS. An active inductor that has an increased inductance value during steady-state conditions is desirable to reduce output ripple, and that has a reduced inductance value during transients to improve transient response. An active inductor that has its inductance value controlled by a circuit is desired.

BRIEF DESCRIPTION OF THE DRAWINGS

FIGS. 7A-7B shown waveforms of the SMPS responding to a jump in load current with the NIC turned on and off.

FIGS. 8A-8B shown waveforms of the SMPS responding to a drop in load current with the NIC turned on and off.

DETAILED DESCRIPTION

The present invention relates to an improvement in active inductor circuits. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that a variable inductor would allow a SMPS to have low ripple by increasing the inductance value, and to have faster transient response by reducing the inductance value. While variable inductors are used in older radio equipment, these variable inductors are often large coils that have magnetic cores that are physically moved to alter inductance.

The inventors realize that an active variable power inductor can be realized by replacing the inductor with a mutual inductance device such as a transformer. The primary windings of the transformer carry inductor current IL in the SMPS. The secondary windings in the transformer are connected to a Negative Inductance Circuit (NIC). The NIC can send current through the secondary windings, which then generates a magnetic field that is coupled through the magnetic core to the primary windings. The NIC can send a current in reverse through the secondary windings to create a mutual inductance in the primary windings that resists current flow and thus increases the inductance value of the primary windings. Thus the NIC can adjust the inductance value seen by the primary windings.

Figure 1:
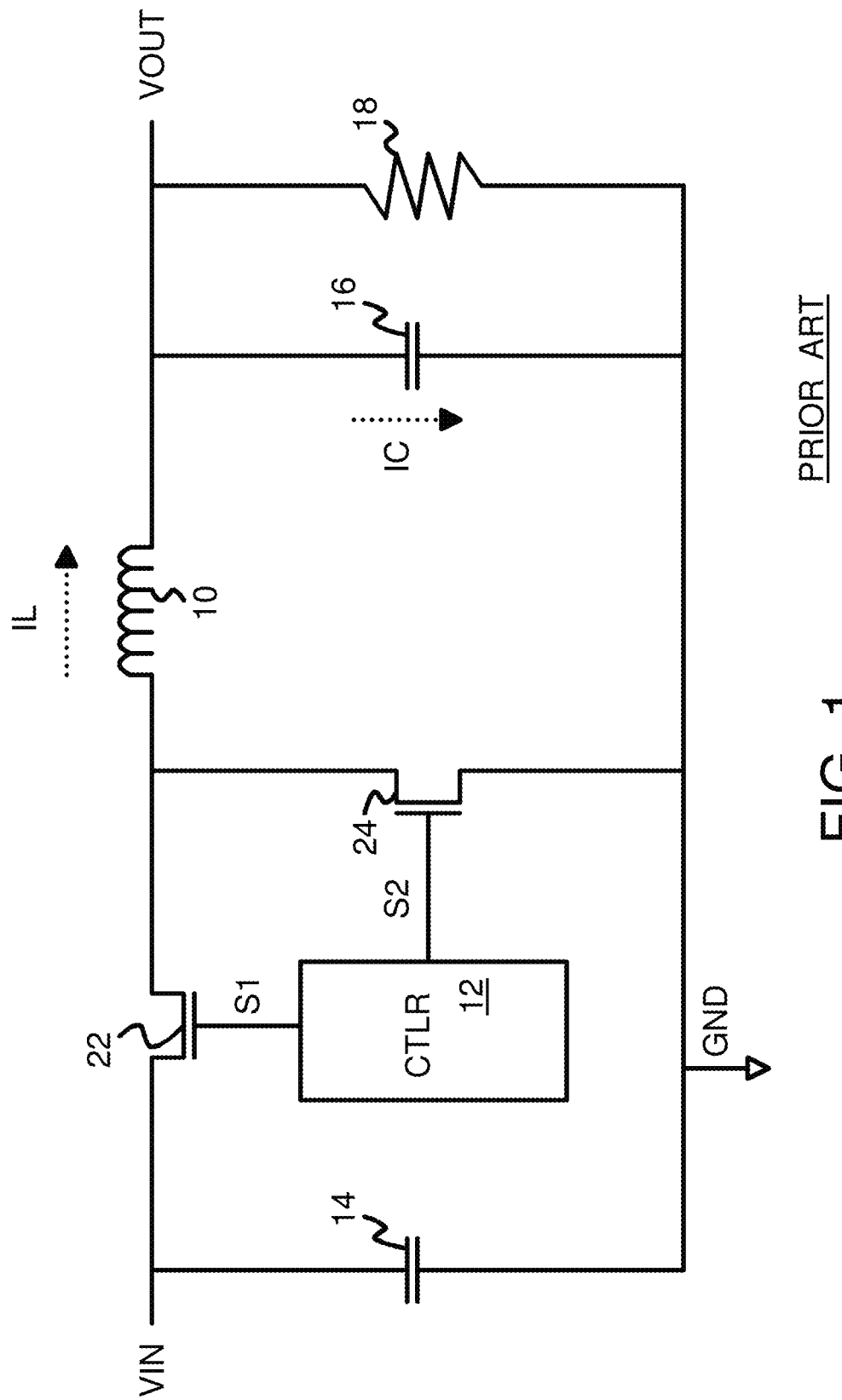
FIG. 1 shows a prior-art SMPS.
Figure 2:
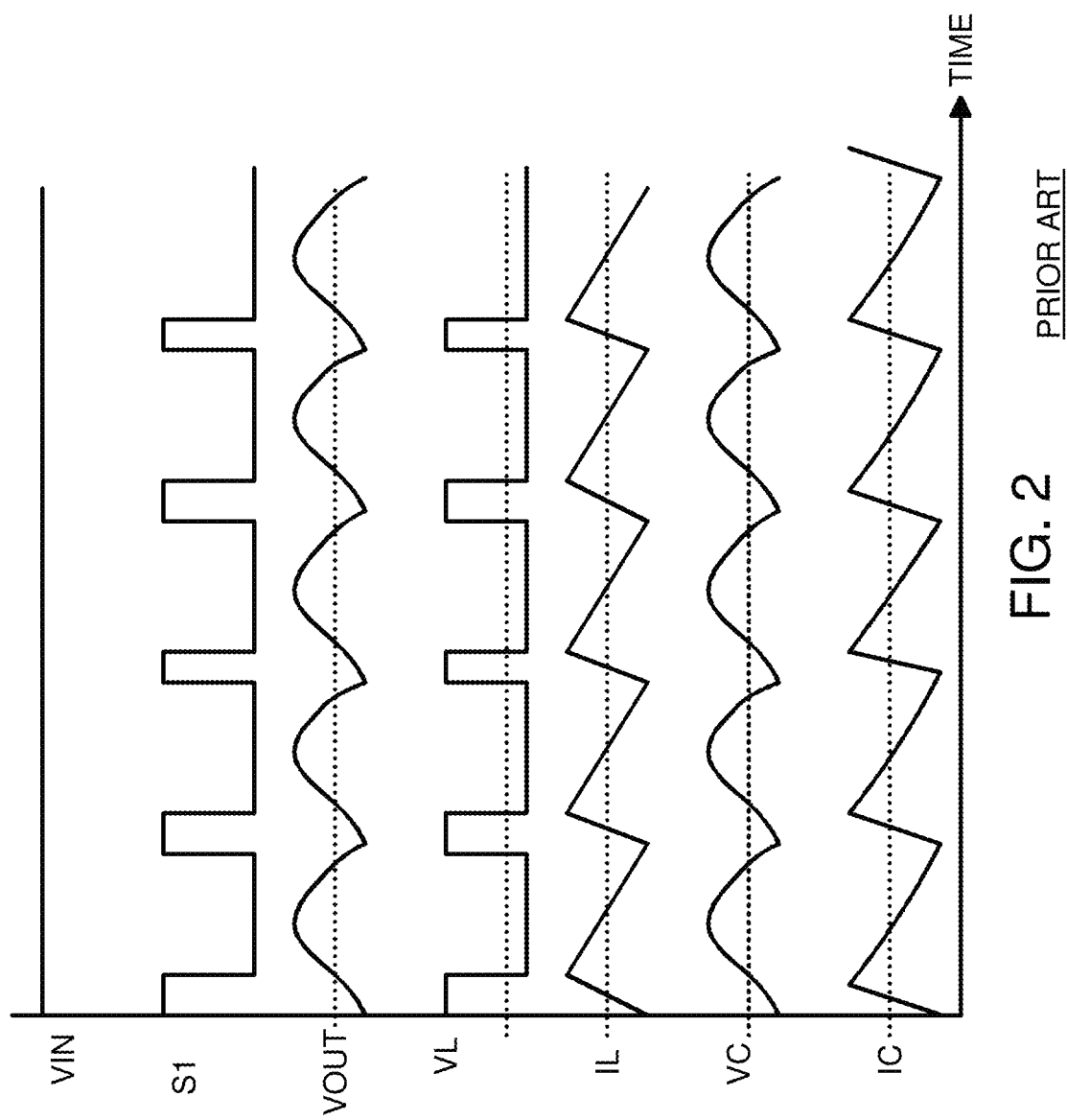
FIG. 2 is a waveform showing operation of the SMPS of FIG. 1.
Figure 3:
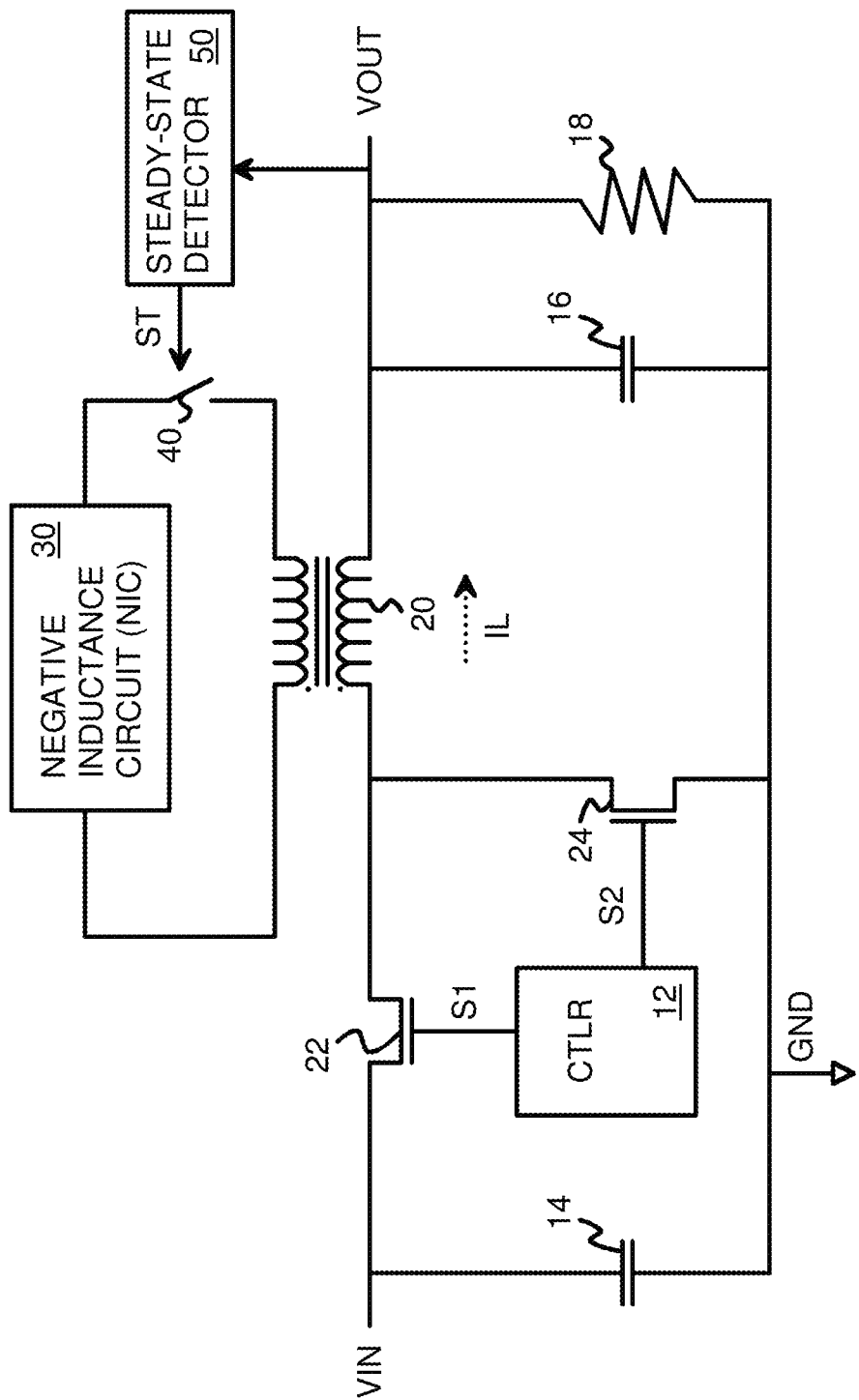
FIG. 3 shows an SMPS with an active inductor.

FIG. 3 shows an SMPS with an active inductor. Inductor 10 of FIG. 1 is replaced by transformer 20. The primary windings of transformer 20 carry inductor current IL from transistor 22 to output capacitor 16.

Controller 12 drives gate signal S1 high to allow current to flow through transistor 22 and the primary windings of transformer 20 to charge output capacitor 16. Controller 12 also drives gate signal S2 high to turn on transistor 24 to reduce the voltage across transformer 20 to maintain a desired output voltage VOUT. Input capacitor 14 is optional but helps to maintain VIN.

Load resistor 18 represents the load driven by VOUT which can vary during operation, creating transients. When no transient occurs, steady-state detector 50 senses that VOUT is within predetermined limits, and drives steady signal ST high, closing switch 40. Switch 40 closes the loop with Negative Inductance Circuit NIC 30 and the secondary windings of transformer 20.

With switch 40 closed, NIC 30 can generate a reverse current that flows through the secondary windings of transformer 20. This reverse current generates a magnetic field in transformer 20 that is coupled through or enhanced by the magnetic core of transformer 20. This generated magnetic field creates an additional inductance in the primary windings of transformer 20. Thus the inductance value of the primary windings of transformer 20 is increased when switch 40 closes to enable NIC 30.

When a sufficiently large transient occurs on the output, VOUT is no longer within the predetermined limits, and steady-state detector 50 drives steady signal ST low, opening switch 40. Switch 40 opens the loop and prevents NIC 30 from driving the reverse current through the secondary windings of transformer 20. The inductance of the primary windings of transformer 20 falls back to its nominal value. The lower inductance value through transformer 20 allows for a larger inductor current IL to flow to the output and to load 18. A faster response to the transient is possible due to the increased current flowing through transformer 20.

The lower inductance value through the primary windings of transformer 20 provides for a higher bandwidth of the SMPS when a transient is detected. When no transient is detected, NIC 30 is enabled to increase the inductance value of the primary windings of transformer 20. This higher inductance during steady state reduces output ripple.

Thus by switching NIC 30 on and off, the equivalent inductance value in the primary is adjusted. High inductance is provided to reduce ripple during steady state, while low inductance is provided for faster transient response times when a transient is detected. For example, when transformer 20 has a rated inductance of 1 µH (the physical inductance value), the equivalent inductance value is 1 µH when NIC 30 is off, and the equivalent inductance value is +2 µH when NIC 30 is on.

Figure 4:
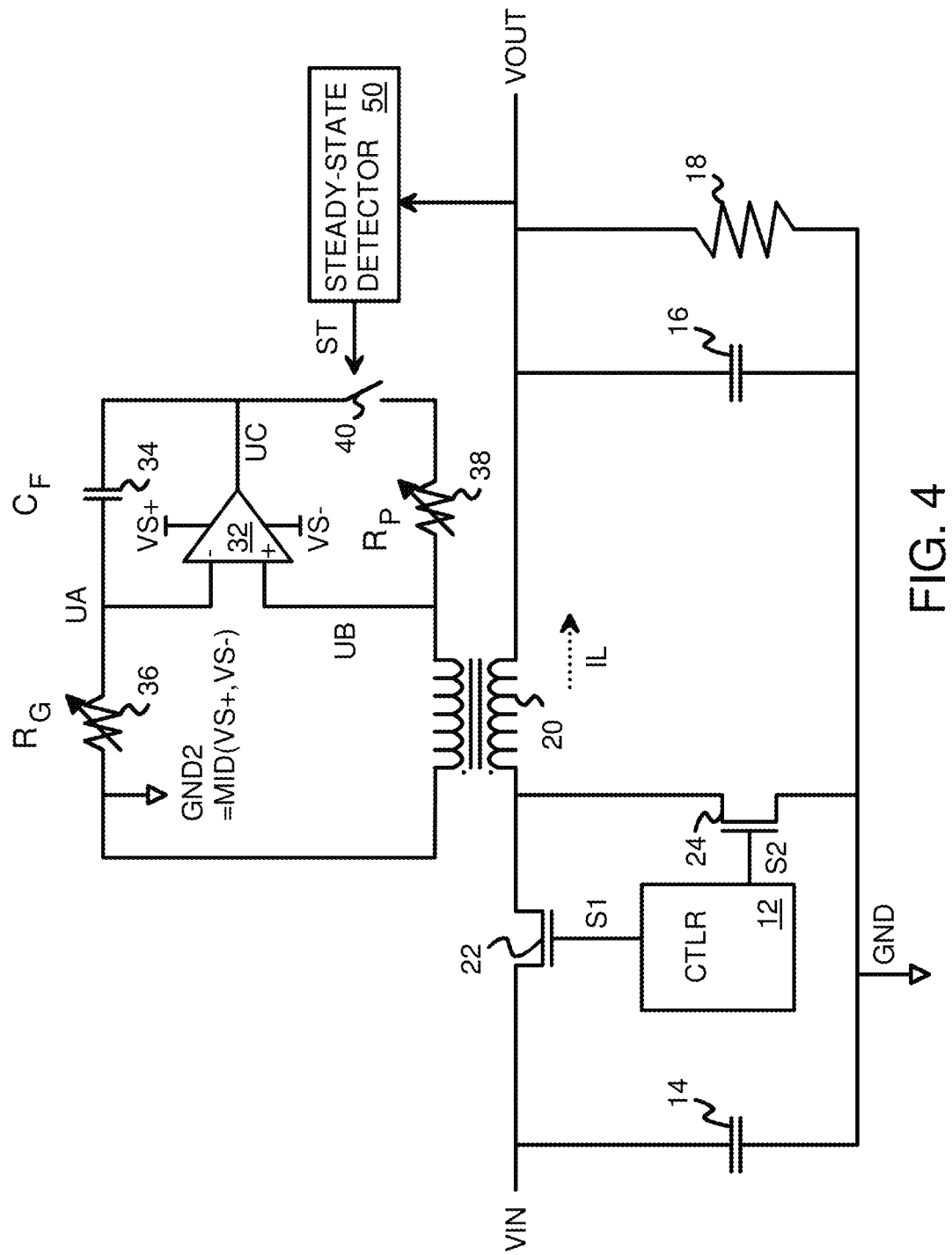
FIG. 4 shows the SMPS with a capacitor-based negative inductance circuit in more detail.

FIG. 4 shows the SMPS with a capacitor-based negative inductance circuit in more detail. Op amp 32 is powered by power supply voltages VS+ and VS−. A midpoint voltage, such as midway between VS+ and VS−, can be used to generate a secondary ground GND2. This ground GND2 is connected to one terminal of the secondary windings of transformer 20, while the other terminal of the secondary windings is connected to the non-inverting input of op amp 32 as node UB.

The inverting input of op amp 32 is node UA, which is connected to ground GND2 by ground resistor 36 with resistance value Rg. Feedback capacitor 34 with capacitance value Cf connects node UA to the output of op amp 32, node UC. Feedback capacitor 34 and ground resistor 36 form a dual feedback network with an impedance of $Z_1/R_g$ causing op amp 32 to provide a gain of $1+Z_1/R_g$.

Switch 40 and positive resistor 38 with resistance value $R_p$ are in series between op amp 32 output node UC and the non-inverting input of op amp 32, node UB. When steady-state detector 50 drives ST high and closes switch 40, second impedance ($Z_p$) connects the noninverting input and output of op amp 32.

Ripples are preset on the primary current through transformer 20 because controller 12 switches power transistors 22, 24 on and off. These ripples have the same frequency as the selected switching frequency. The inductor circuit is a voltage controlled current source. The mutual inductance through the metal core of the transformer 20 induces a voltage UB at the end of the secondary winding. According to the characteristics of an operational amplifier, the voltages at the non-inverting input (+) and the inverting input (−) of op amp 32 are equal, so voltage UA at the inverting input is equal to voltage UB at the non-inverting input. Due to the feedback network through feedback capacitor 34, a voltage gain is generated, and the output voltage after the gain of op amp 32 is UC. In this case, the voltages UC and UB at the two ends of positive resistor 38 create a reverse AC current on positive resistor 38. This reverse AC current is opposite in phase to the ripple portion of IL and is coupled through the secondary winding of transformer 20 to the primary winding of transformer 20. The coupled ripple portion of IL has the same phase as the original ripple, but the ripple amplitude is reduced Mutual inductance through the metal core of transformer 20 induces similar ripples in the secondary current. These ripples in the secondary current are applied to the non-inverting (+) input of op amp 32 and are amplified by the gain factor and converted to current flowing through positive resistor 38 when switch 40 is closed. Positive resistor 38 converts these ripples to a voltage difference across positive resistor 38 and provides a current that flows in reverse through the secondary windings of transformer 20, from the right terminal to the left terminal and GND2.

A first impedance network is attached to the inverting (−) input of op amp 32, while a second impedance network is attached to the non-inverting (+) input of op amp 32. Ground resistor 36 and feedback capacitor 34 connect to the inverting input of op amp 32 and form a first impedance network that is an inverting feedback network. Positive resistor 38 connects to the non-inverting (+) input of op amp 32 and forms a second impedance network.

A voltage ripple from the primary current induces an AC ripple into the secondary current because of the mutual inductance of transformer 20. This AC ripple of the secondary current is applied to the non inverting (+) input of op amp 32 and causes an AC ripple in the op amp output current when switch 40 is closed. The reverse amplification gain of op amp 32 is $1+Z_1/R_g$. Impedance $Z_1$ is from feedback capacitor 34.

In this embodiment, with scaling factor s, the first impedance is $Z_1=1/(sC_f)$ and the second impedance is $Z_p=R_p$. Ground resistor 36 and positive resistor 38 can be variable resistors or can be fixed resistors once their resistance values have been set, such as by circuit analysis, simulation, or testing with a prototype. When ground resistor 36 and positive resistor 38 are variable resistors, they can be programmable, such as with a resistor bank that has resistors selectable by a programmable register that can be programmed by a program.

Scaling factor s is the complex frequency. In frequency domain analysis, the complex frequency s is a complex number denoted as $s=\sigma+j\omega$, where $\sigma$ is the real part, denoting the decay or growth factor, and $j\omega$ is the imaginary part, denoting the angular frequency. For ideal inductors and capacitors, $\sigma$ is 0. The frequency domain s is defined as the decomposition of the signal into imaginary exponential components of different frequencies and the response of the system may be obtained by Fourier inverse transformation.

The SMPS operates as described before, except that the inductance value of the primary windings of transformer 20 is boosted to reduce ripple when steady-state detector 50 determines that VOUT remains within predetermined limits. When VOUT has a transient that is not within the predetermined limits, steady-state detector 50 drives ST low to open switch 40 and turn off the current in the secondary windings. The equivalent inductance of the primary windings falls to a nominal value. The lower nominal inductance allows for a larger peak-to-peak value of the ripple within a cycle to flow to the load, which has a larger current slope, allowing for faster transient response.

In practice, the inductance value of the primary windings are adjustable and can double or triple when the reverse current flows through the secondary windings. The amount of inductance increase due to the NIC can be adjusted by adjusting values of resistance of ground resistor 36, positive resistor 38, the capacitance of feedback capacitor 34, and the windings ratio and magnetic core (mutual inductance) of transformer 20.

Figure 5:
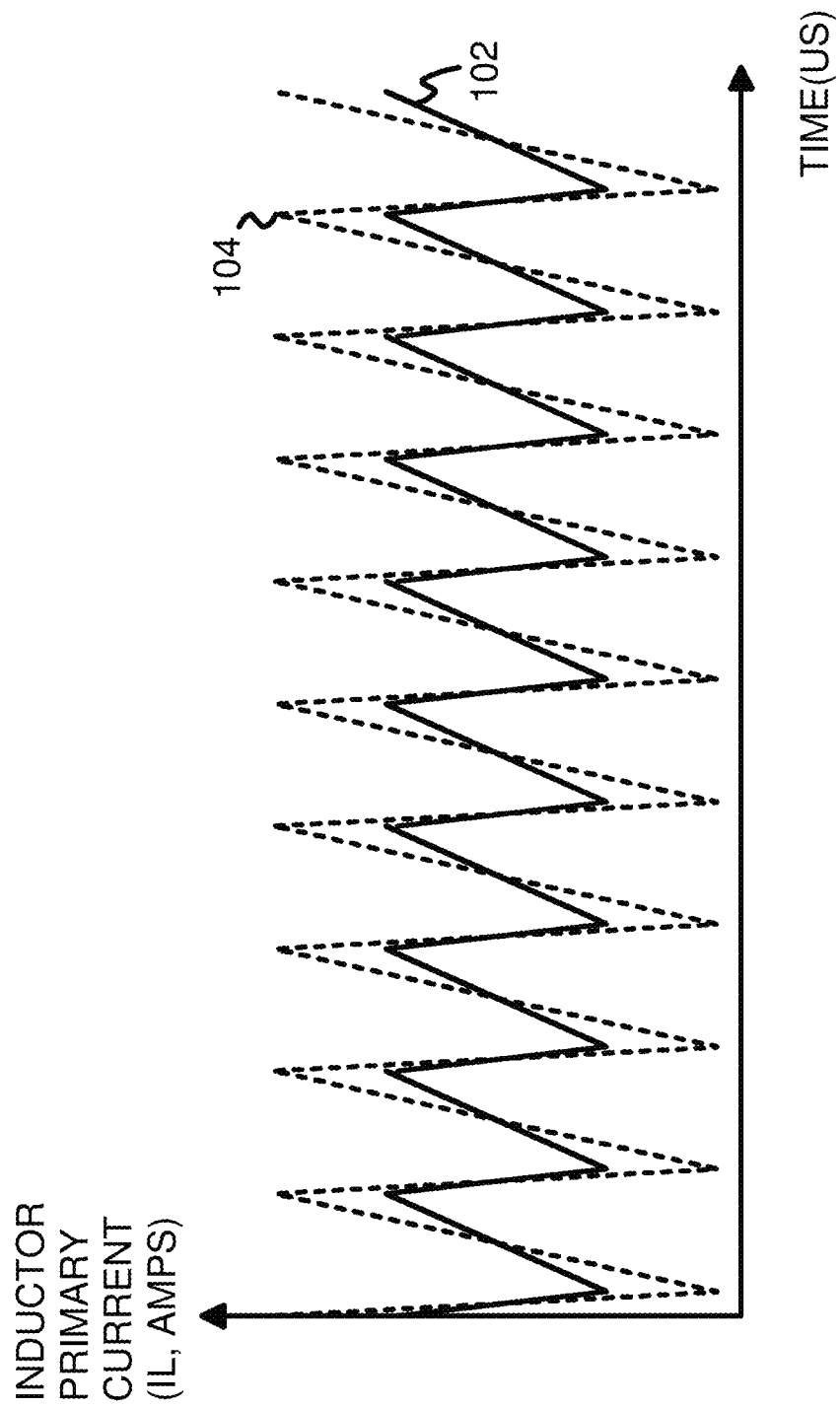
FIG. 5 is a graph of the primary current in the transformer with the NIC turned on and off.

FIG. 5 is a graph of the primary current in the transformer with the NIC turned on and off. The inductor primary current IL flows thorough the primary windings of transformer 20 (FIG. 4). This inductor current IL has a low value of waveform 102 when steady-state detector 50 detects steady-state and closes switch 40 to enable NIC 30. If switch 40 remains open during steady state, NIC 30 is turned off and the secondary current in transformer 20 is halted. The lower equivalent inductance allows for a higher inductor current IL to flow in the primary windings, as seen by waveform 104.

Figure 6:
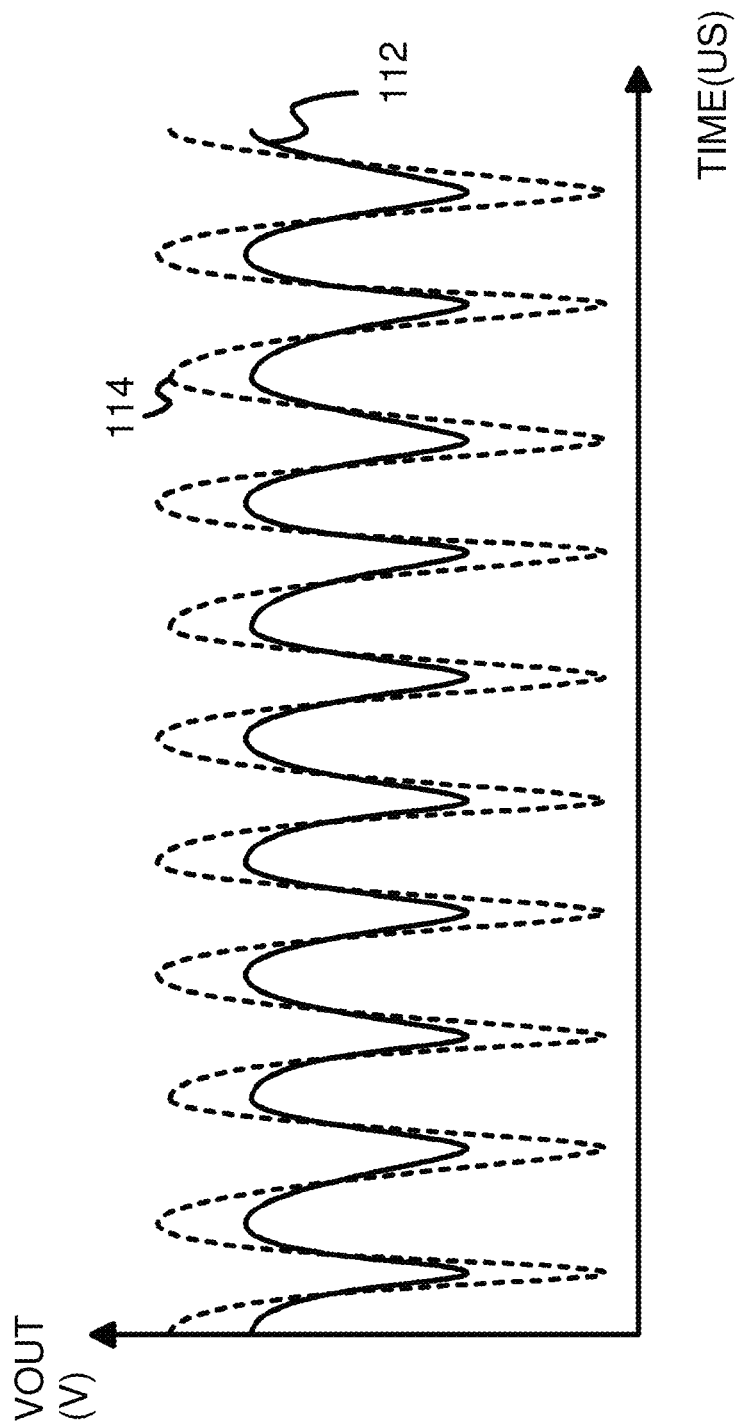
FIG. 6 is a graph of the output voltage VOUT with the NIC turned on and off.

FIG. 6 is a graph of the output voltage VOUT with the NIC turned on and off. There is a ripple on the output, as shown by output voltage VOUT rising and falling. The absolute value of the ripple is small, but this ripple is still undesirable.

When there are no transients steady-state detector 50 detects the steady-state and closes switch 40 to enable NIC 30. The equivalent inductance of the primary windings of transformer 20 is larger than (double or triple) the nominal value (such as 1 micro-Henry) because of mutual inductance from the reverse current flowing through the secondary windings from op amp 32. This higher equivalent inductance acts to resist changes in inductor current and thus reduces changes in VOUT due to the normal switching on and off of transistors 22, 24 by controller 12. Waveform 112 shows the reduced ripple on VOUT when NIC 30 is turned on.

If switch 40 remains open during steady state, NIC 30 is turned off and the secondary current in transformer 20 is halted. The lower equivalent inductance allows for a higher inductor current IL to flow in the primary windings. Since this inductor current is switched on and off by transistors 22, 24, this modulation of a higher inductor current causes larger swings in VOUT, as seen by waveform 114.

FIGS. 7A-7B show waveforms highlighting the effect of turning the NIC on and off on VOUT for transients with sudden increases in the SMPS load current.

In FIG. 7A, the load current ILOAD through load resistor 18 suddenly increases, such as when transistors in the load switch states and draw a large transient current. In FIG. 7B, the output voltage VOUT suddenly drops due to this sudden increase in load current. When NIC 30 is turned off, a simulation produces waveform 122, which recovers faster than waveform 124, which is from a simulation with NIC 30 turned on. Thus when steady-state detector 50 detects a transient and turns off NIC 30, transients can be recovered from more quickly.

Even if the transient is faster than steady-state detector 50 and NIC 30 can be turned on, there may be other transients that follow that may benefit from NIC 30 being turned off by the first transient.

FIGS. 8A-8B show waveforms of the effect of the NIC turning on and off on VOUT for transients with sudden drops in SMPS load current. In FIG. 8A, the load current ILOAD through load resistor 18 suddenly drops, such as when transistors switch to a light load.

In FIG. 8B, the output voltage VOUT suddenly spikes higher due to this sudden decrease in load current. When NIC 30 is turned off, a simulation produces waveform 132, which recovers faster with lower ripple than waveform 134, which is from a simulation with NIC 30 turned on. Thus when steady-state detector 50 detects a transient and turns off NIC 30, both high-going and low-going transients can be recovered from more quickly.

Figure 9:
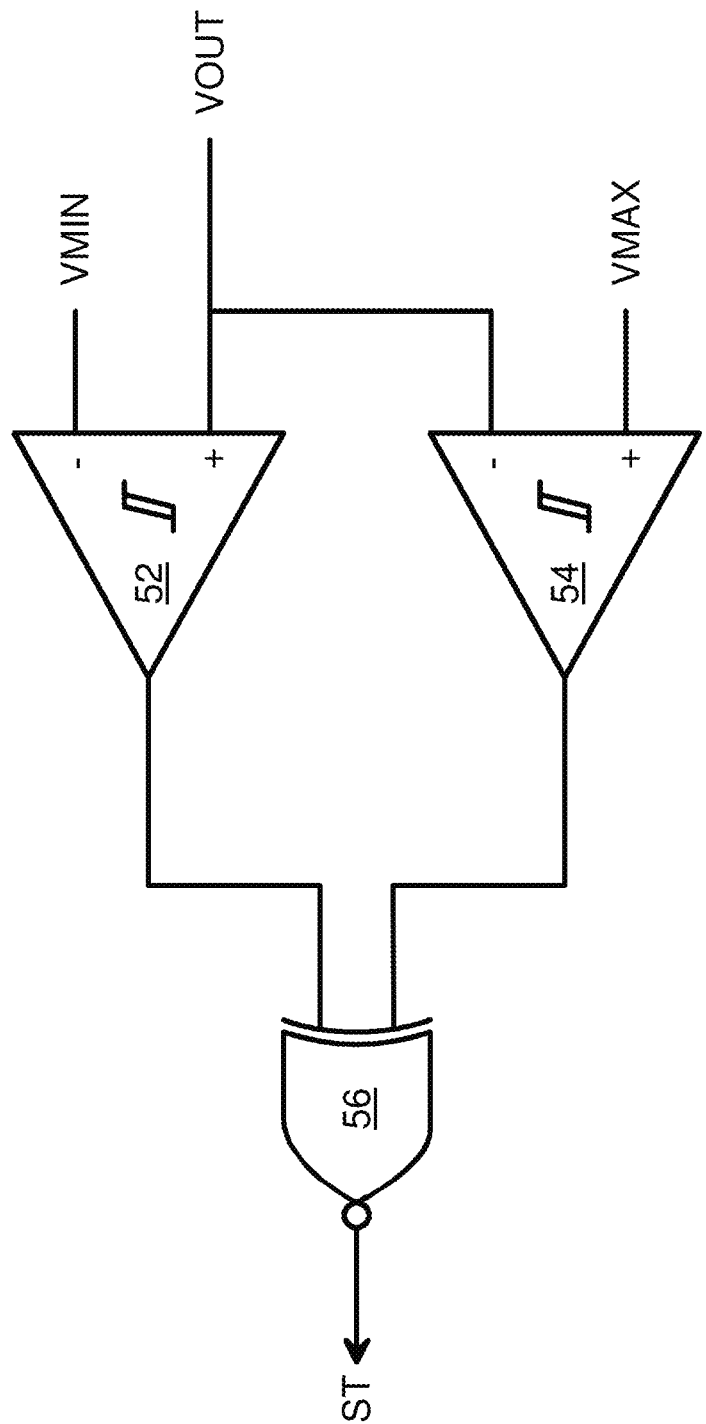
FIG. 9 shows an embodiment of the steady-state detector in more detail.

FIG. 9 shows an embodiment of the steady-state detector in more detail. Output voltage VOUT is input to steady-state detector 50 and compared to predetermined voltage limits VMIN, VMAX that can be set to an acceptable level of ripple or may be determined by testing or simulation to best determined when to enable transient response.

Comparator 52 drives its output high when VOUT is above VMIN, or within the lower limit. Comparator 54 drives its output high when VOUT is below VMAX, or within the upper limit. Thus when both outputs are high, VOUT is within the predetermined limits. The 11 inputs applied to XNOR gate 56 drive its output, steady signal ST, high. This turns on NIC 30 for steady-state conditions of VOUT.

When VOUT is above VMAX, comparator 54 drives its output low, while comparator 52 still drives its output high. The 01 inputs to XNOR gate 56 drive its output ST low, turning off NIC 30 for better transient response.

When VOUT is below VMIN, comparator 52 drives its output low, while comparator 54 still drives its output high. The 10 inputs to XNOR gate 56 drive its output ST low, turning off NIC 30 for better transient response.

Figure 10:
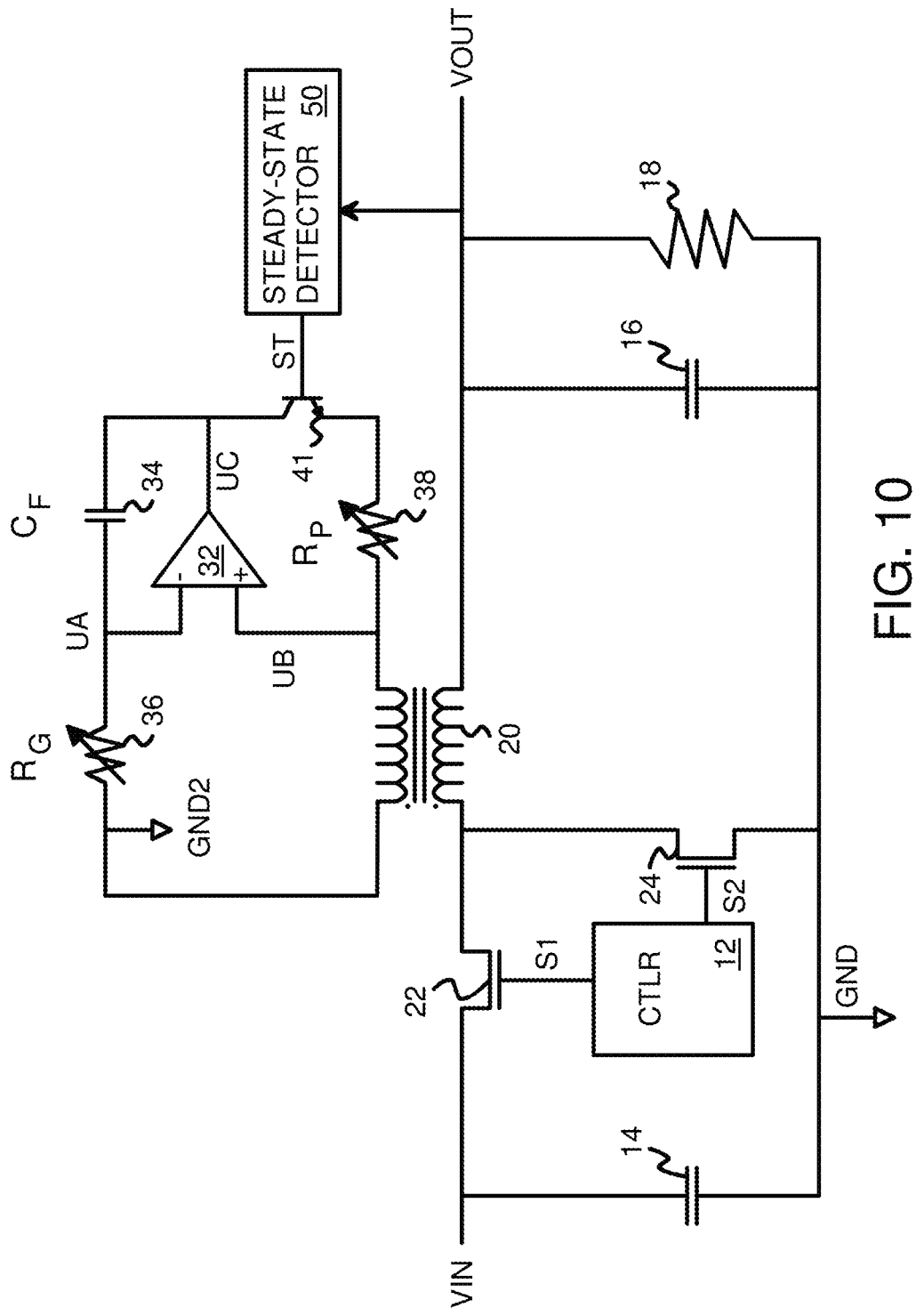
FIG. 10 shows the SMPS with the NIC having a bipolar transistor switch.

FIG. 10 shows the SMPS with the NIC having a bipolar transistor switch. In this embodiment, switch 40 is implemented as bipolar NPN transistor 41. The transistor base is driven by steady-state signal ST that is generated by steady-state detector 50.

Figure 11:
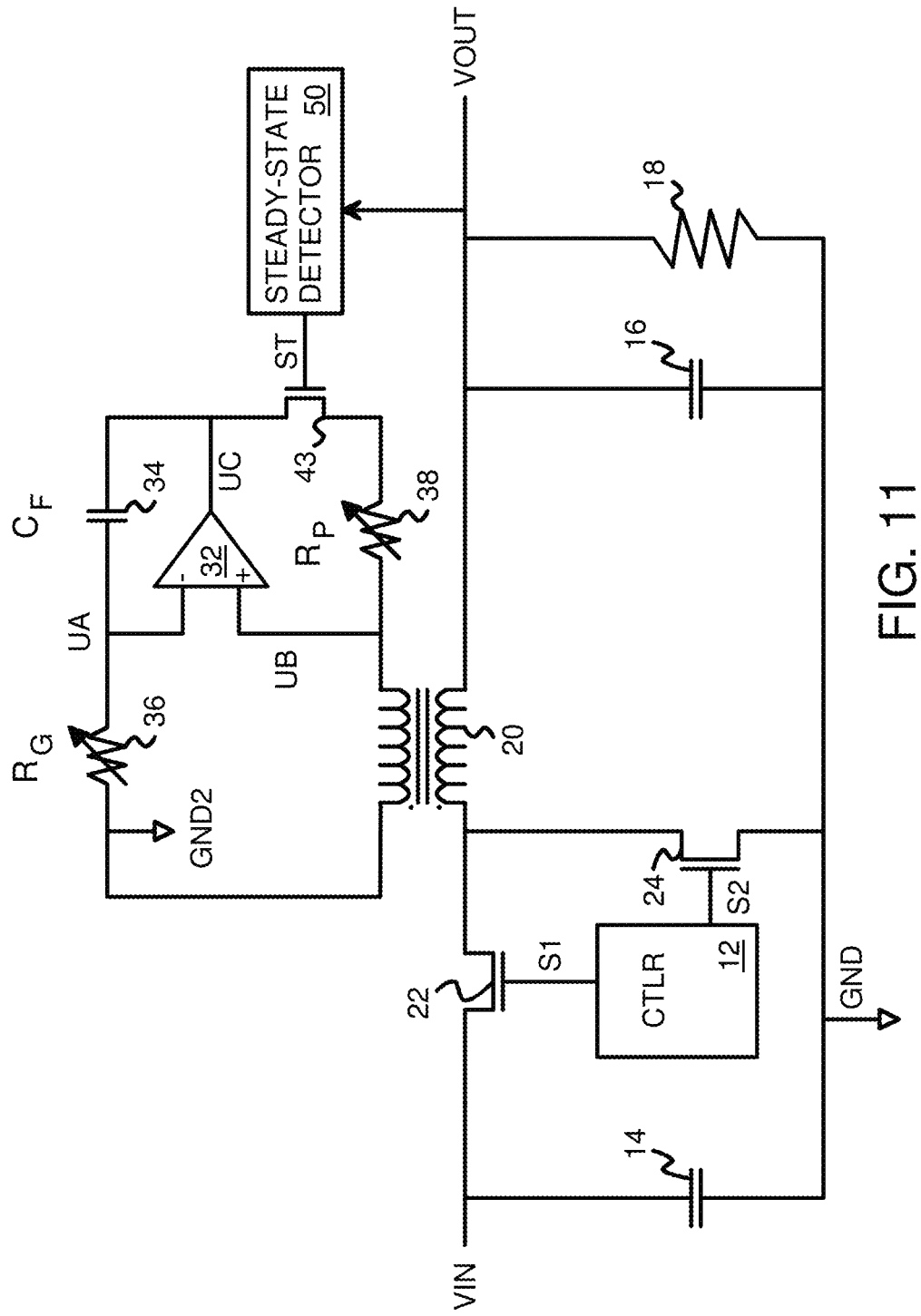
FIG. 11 shows the SMPS with the NIC having an n-channel transistor switch.

FIG. 11 shows the SMPS with the NIC having an n-channel transistor switch. In this embodiment, switch 40 is implemented as n-channel transistor 43. The transistor gate is driven by steady-state signal ST that is generated by steady-state detector 50.

Figure 12:
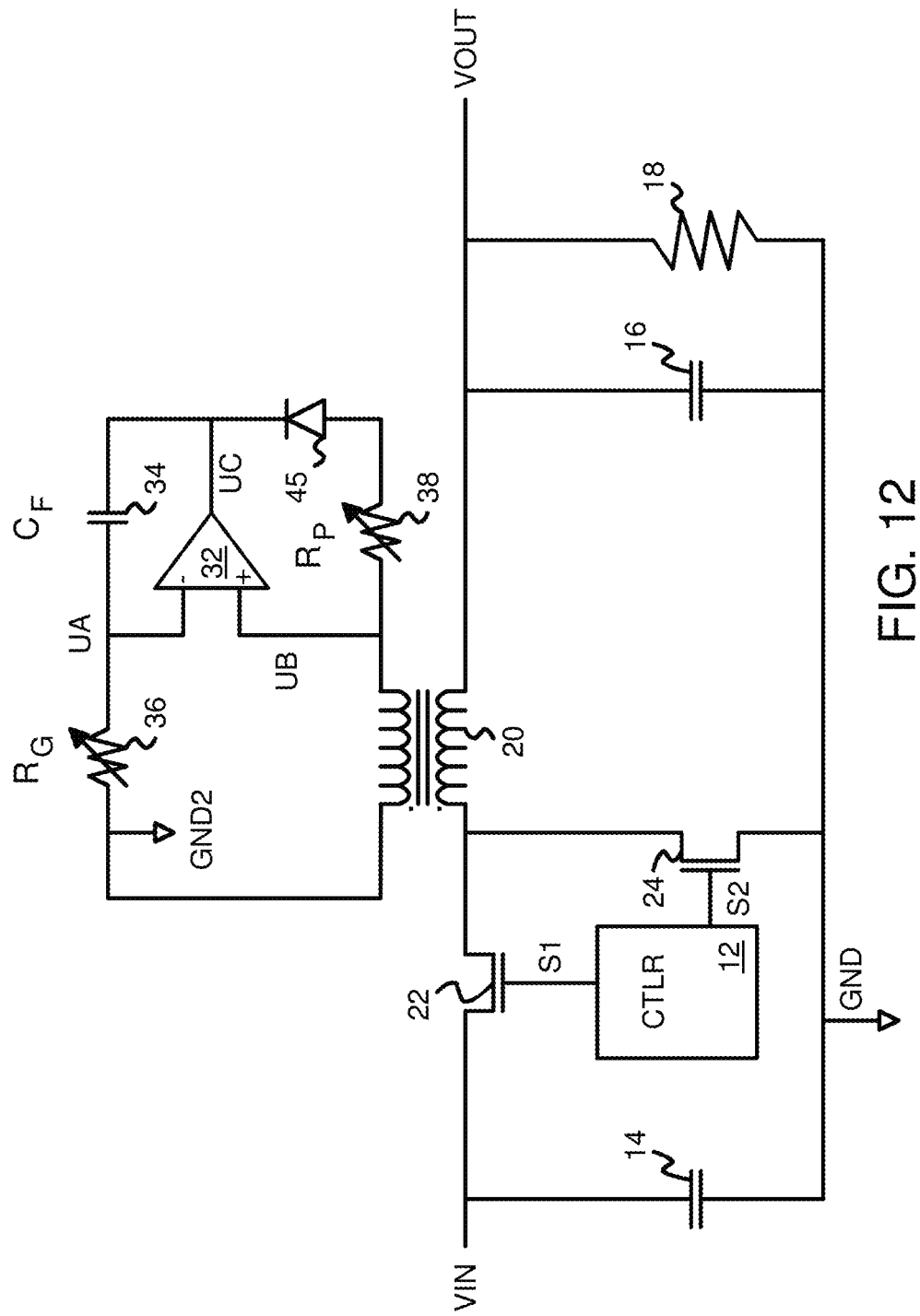
FIG. 12 shows the SMPS with the NIC having a diode switch.

FIG. 12 shows the SMPS with the NIC having a diode switch. In this embodiment, switch 40 is implemented as diode 45. Since diode 45 has no control gate, ST and steady-state detector 50 are not needed.

Diode 45 blocks reverse current flow. NIC acts as a voltage-controlled current source. In steady-state, diode 45 only allows a positive current to pass through it. A small forward voltage across diode 45 is required for current to flow. This results in a small DC offset. At low voltages diode 45 turns off and the current waveform is clipped at these low voltages of the AC ripple.

When a positive transient occurs, a large but low frequency current rise is sensed by op amp 32. The voltage into diode 45 rises with the low-frequency rise due to the transient. This higher voltage allows diode 45 to remain on longer and to flow more secondary current while the transient occurs. The higher secondary current increases the mutual inductance, and the higher primary inductance.

Although there is no steady-state detector 50 in this embodiment, diode 45 itself can react according to the voltage applied to it, i.e. when the voltage is negative, diode 45 blocks current; when the voltage is positive, diode 45 conducts. When transient occurs, the load current increases in the primary circuit, and this increase is sensed through transformer 20 to node UB. Then the two terminals diode 45 also 'sense' a voltage change since diode 45 is connected in series with transformer 20. For a short time diode 45 is forward biased during the voltage change, so there is a low frequency transient current change induced.

Figure 13:
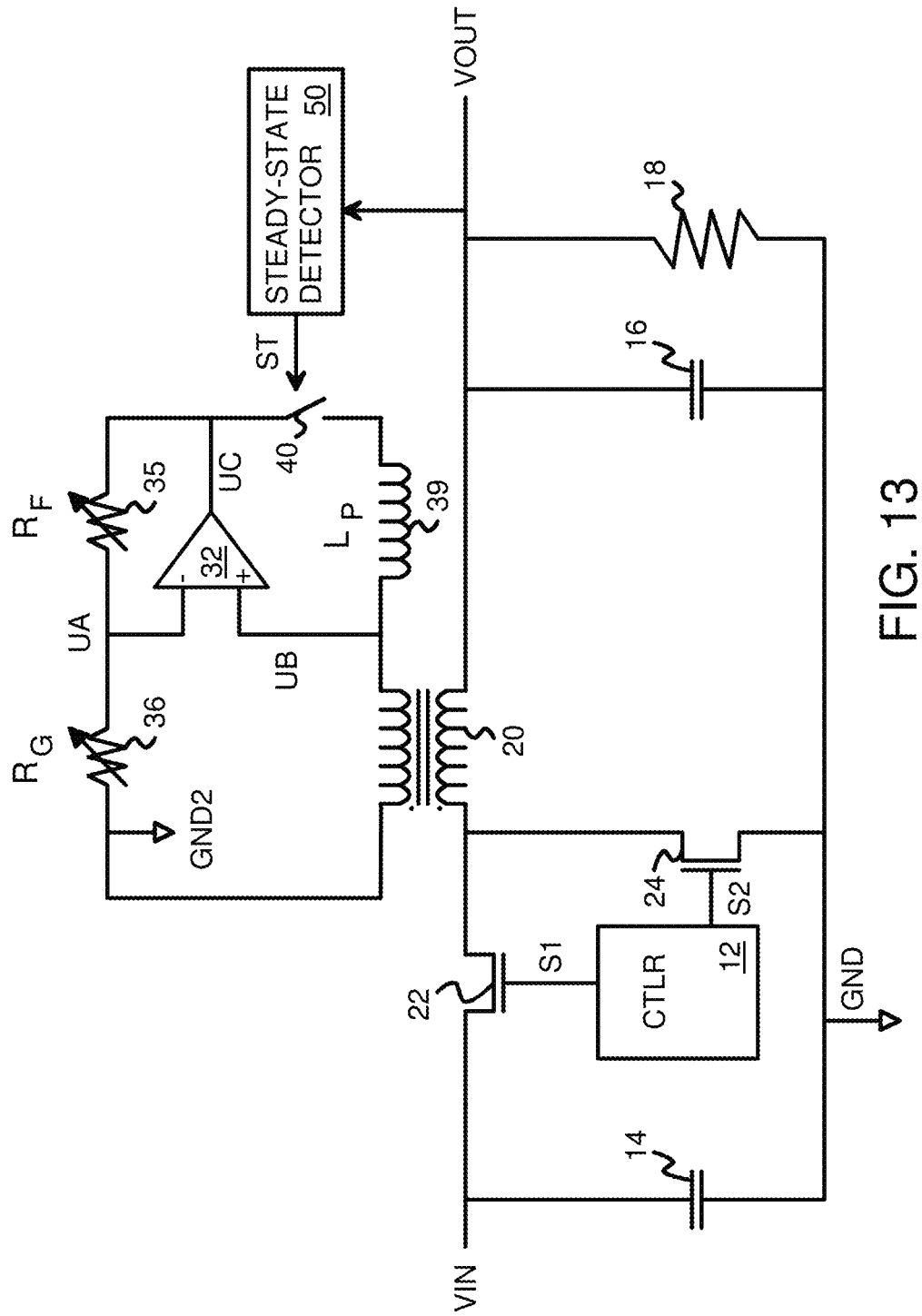
FIG. 13 shows the SMPS with the NIC with a positive inductor.

FIG. 13 shows the SMPS with the NIC with a positive inductor. In this embodiment, ground resistor 36 is replaced by ground inductor 39 and feedback capacitor 34 is replaced by feedback resistor 35. In this embodiment, $Z_1=R_f$ of feedback resistor 35, while $Z_2=sL_p$, where s is the complex frequency and $L_p$ is the inductance value of ground inductor 39. The gain generated by feedback capacitor 34 (FIG. 4) is affected by the switching frequency. However, using feedback resistor 35 produces a fixed gain that is not affected by frequency.

Figure 14:
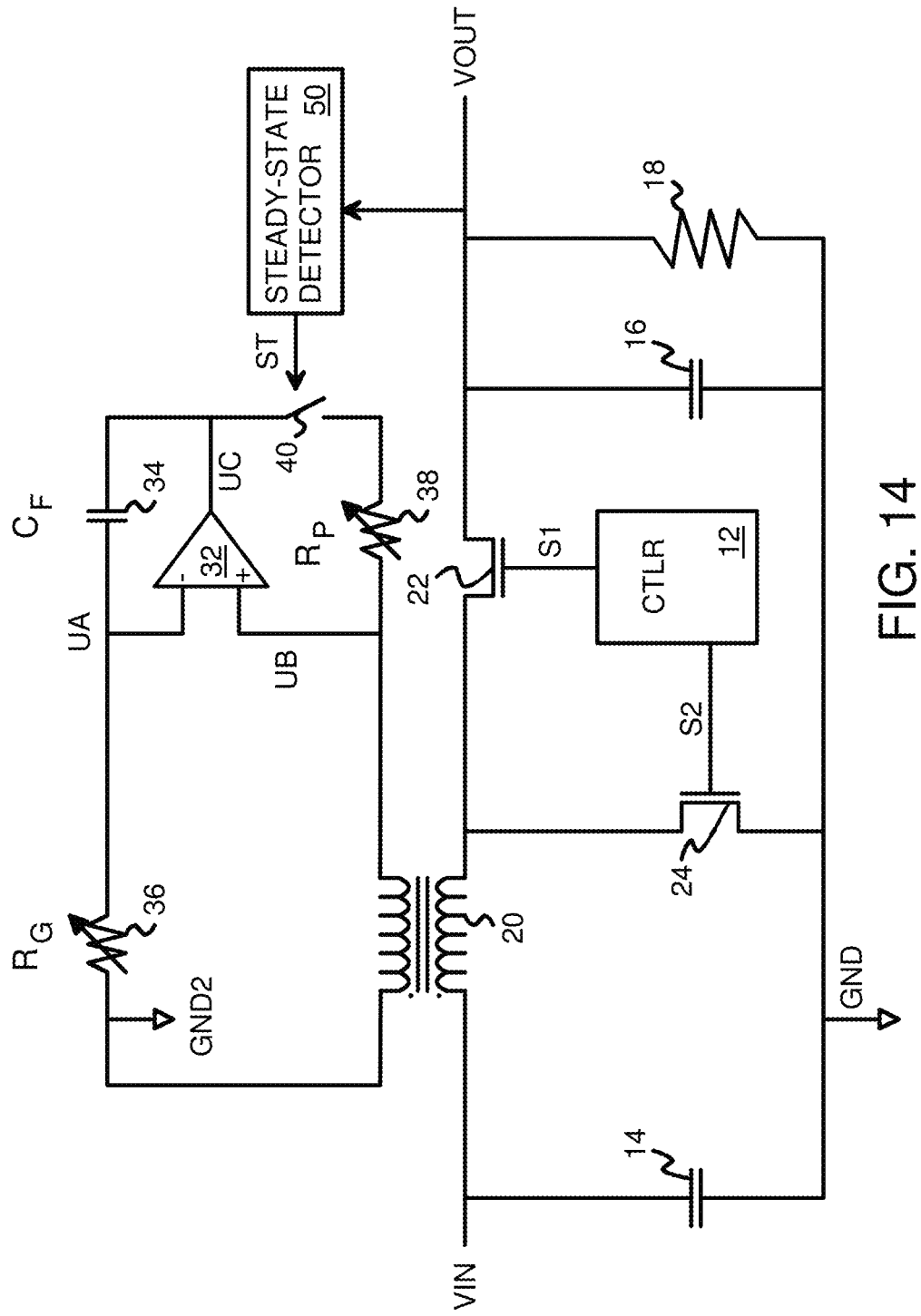
FIG. 14 shows a boost converter SMPS with a NIC.

FIG. 14 shows a boost converter SMPS with a NIC. In this embodiment, a boost converter rather than a Buck converter is used for the primary converter. Power transistor 22 is located after transformer 20 rather than before transformer 20 as in the Buck converter shown in FIGS. 3, 4, 10-13. Power transistor 24 to ground is located before transformer 20 rather than after transformer 20.

Figure 15:
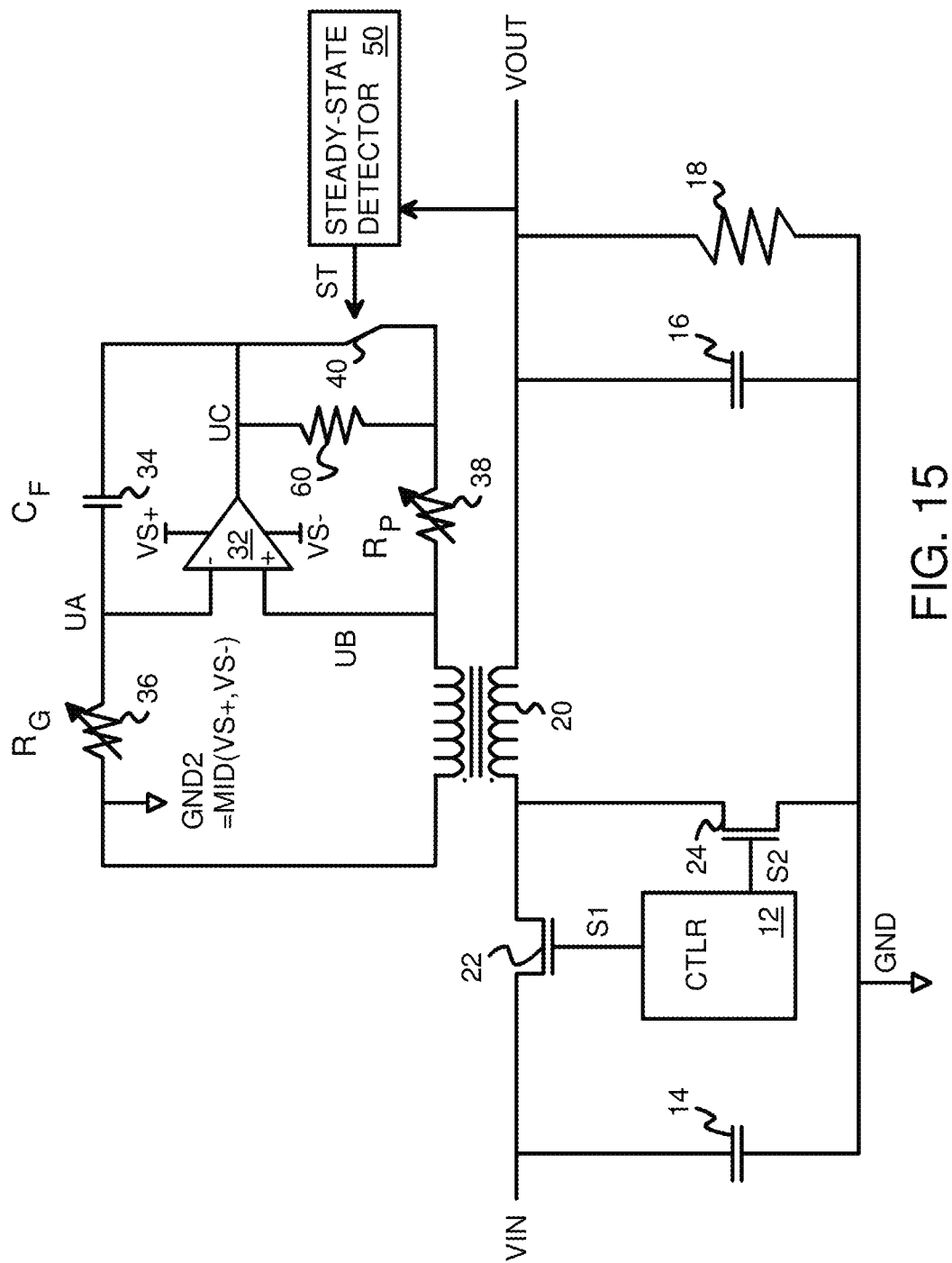
FIG. 15 shows a SMPS with a NIC that only partially modulates the secondary current.

FIG. 15 shows a SMPS with a NIC that partially modulates the secondary current. In this embodiment, switch shunt resistor 60 in in parallel with switch 40. Some current from the output of op amp 32 passes through switch shunt resistor 60 even when switch 40 is open. Thus NIC 30 remains on even when steady-state detector 50 detects a transient and drives steady signal ST low to open switch 40. When steady-state detector 50 detects the steady state and drives steady signal ST high, switch 40 closes and current from the output of op amp 32 passes through switch 40 and switch shunt resistor 60 in parallel. Thus closing switch 40 increases the current through positive resistor 38, and thus increases the secondary current in transformer 20.

Rather than turn NIC 30 fully on and off, NIC 30 remains on, but its current is modulated by steady-state detector 50. Leaving NIC 30 on can be advantageous because turning op amp 32 on and off may require time to reinitialize, resulting in delays when ST is switched on and off.

The amount of current that is modulated between the two states can be adjusted by adjusting the resistance value of switch shunt resistor 60 and of switch 40. Another resistor could be added in series with switch 40 to further adjust the current ratio. Thus more design flexibility is introduced with switch shunt resistor 60.

ALTERNATE EMBODIMENTS

Several other embodiments are contemplated by the inventors. For example many combinations and variations of switch 40 are possible. The switch could be any kind of transistor, such as an Insulated-Gate transistor or diode, NPN or PNP or other triode, and could have a network of transistors rather than a single transistor.

While a Buck converter arrangement of transistors 22, 24 has been shown in most drawings, and a Boost converter shown in FIG. 14, other converters may be substituted, such as Buck-boost, isolated, or multiphase converters. Other SMPS, such as Cuk or Sepic may be substituted.

There are many possible embodiments of steady-state detector 50. The embodiment in FIG. 9 may swap inverting and non-inverting inputs to the comparators, inverters may be added or removed, and other gating may be used other than XNOR. A differentiator or a load transient detector may be used.

The output voltage may be sensed by a resistive network, and then the signal is passed directly to the buck control loop comparator for handling, as another alternative for steady-state detector 50.

Alternately, the input voltage node of the buck converter may be used for transient detection instead of the output voltage node for faster detection, and an auxiliary buck converter is used to smooth the transient spike.

By using a resistive network and an improved Differential Difference Amplifier (DDA)-based Type-III compensator, such as an OTA, the load transient response could be detected and passed to the comparator in control loop.

Steady-state detector 50 could use the input node instead of the output node for sensing the load step. Alternately, steady-state detector 50 could sense current in the output capacitor or the voltage at the load side to detect the variation. Together with the comparator, the control can be realized by setting a proper threshold of the comparator.

Comparators 52, 54 can be op amps or other compare circuits. Hysteresis can be added to require that a transient last for a predetermined time period before triggering steady-state detector 50 to turn off steady-state signal ST. XNOR 56 can be an XOR gate followed by an inverter. Rather than have two predetermined voltage levels, providing transient response for both high and low transients, only one voltage limit could be provided, with one comparator. For example, steady-state detector 50 could turn off steady-state signal ST only for high-going transients that exceed VMAX, but not turn off ST for low-going transients. This may be useful when only high-going transients are problematic or severe.

Rather than have an active-high steady-state signal ST, and active low signal could be used. The signal may be inverted for use with certain types of switches. Rather than have just a single n-channel transistor as the switch, a transmission gate with both p-channel and n-channel transistors in parallel may be used, with an inverter to generate STB for the p-channel gate.

Steady-state detector 50 may be powered by VS+, VS− or by another power supply and have voltage level shifters as needed. The secondary ground GND2 can be isolated from the primary ground GND, or may be coupled to it. Other power and grounding schemes could be substituted. Power and ground voltages may be shifted. GND2 may be a reference voltage of some sort and does not have to be exactly the midpoint voltage.

Other impedance networks of resistors, capacitors, and/or inductors could be added around op amp 32, and the values of these components adjusted as desired. Transformer 20 could be any kind of mutual inductance device with core energy storage, such as a PCB inductor with E core or C core, or a planar transformer. Rather than a single transformer, two or more transformers may be placed in series to obtain a desired nominal inductance. While a transformer with a metal or iron core has been described, the metal core could be removed if a sufficient mutual inductance is available. The number of turns in the primary and secondary of transformer 20 could vary, and different wire gages (cross-sectional areas) could be used for the primary and secondary windings. These factors can affect the mutual inductance and nominal inductance values.

While the term windings has been used generically to describe the wire paths that carry the primary current or secondary current within transformer 20, these windings do not have to be uniform loops but can have various physical arrangements and configurations and shapes. The windings may each be a long wire that is wound or wrapped around a metal core, but the windings could also be a spiral pattern on a plane for a planar transformer. The primary and secondary windings could be in separate planes. Many other variations are possible. There may be intermediate terminals, such as an intermediate terminal halfway along the primary winding, between a left primary termina and a right primary terminal. There may be a third winding for a third current path through transformer 20, such as an auxiliary winding for sensing, shielding, or testing.

In general, the impedance of the secondary loop, Z (UA−UB)=−$sC_fR_pR_g$=$sL_{eq}$, and can be adjusted to a design target value by adjusting or trimming the resistor and capacitor values.

Any mutual inductor with a primary loop and a secondary loop that are electrically isolated but connected magnetically by mutual inductance may be used for transformer 20. Transformer 20 has been described as having a primary winding that has primary current flowing from a left terminal (switched from VIN) to a right terminal (VOUT), and the secondary winding having a left terminal that is grounded and a right terminal that is driven by current from op amp 32 through positive resistor 38. Thus the secondary current ripple is reduced, thereby reducing the primary current ripple. So the secondary current flows in the same direction as the primary current, thus increasing primary inductance when the secondary current flows. However, other arrangements are possible, such as having primary and secondary currents flow in the opposite direction with the primary inductance decreasing rather than increasing when switch 40 closes and secondary current increases. Various component parameters and applications may be substituted. The secondary winding orientation may be changed, such as by changing the orientation of the homonymous end. After changing the homonymous end, switch 40 can be in the off state when steady state is detected. When a transient state is detected, switch 40 is on in this alternative. An inverter could be added to invert steady signal ST from steady-state detector 50 and the inverted ST applied to switch 40. Switch 40 could be a normally-closed rather than a normally-open switch.

NIC 30 and transformer 20 provide an active inductor with a variable inductance value in the primary windings. This variable inductance can be modulated to a high inductance to reduce ripples in steady state, and modulated to a low inductance to extend the bandwidth and better suppress or converge transient spikes. This active inductor may allow for a smaller output capacitor to be used for a target amount of ripple and transient suppression. DC copper losses can also be reduced with the smaller output capacitance and variable inductance. Trimming to meet target inductance values for switch 40 being ON and OFF can be achieved by adjusting the resistance values of ground resistor 36, positive resistor 38.

Switch 40 is in series with positive resistor 38. As an alternative order, positive resistor 38 could connect between the output of op amp 32 and the switch, while the switch connects between positive resistor 38 and the non-inverting input of op amp 32.

More complex buffers, level shifters, or other components could be substituted or added. Inversions could be added at various locations. Hysteresis of other delays and output wave shaping could be added. Other kinds of buffer circuits, selectors, or muxes may be used.

Transformer 20 only affects the AC components, not the DC components, of the output VOUT. Controlling the impedance of the active inductor, transformer 20, can reduce ripple in steady state by increasing the equivalent impedance value and increasing the filtering effect of transformer 20 and output capacitor 16, and can also suppress transients and spikes by decreasing the equivalent impedance of transformer 20, allowing output current to increase or decrease faster to the load, thus increasing the bandwidth and speeding convergence. The AC components of the primary can be considered to be absorbed by the mutual inductance from the reverse current flowing in the secondary as the inductance stores energy from the primary-side AC components into the magnetic fields.

Different transistor, capacitor, resistor, inductor, transformer, and other device sizes can be used, and various layout arrangements can be used, such as multi-leg, ring, doughnut or irregular-shape transistors. Currents can be positive or negative currents and flow in either direction. Many second and third order circuit effects may be present and may be significant, especially for smaller device sizes. A circuit simulation may be used to account for these secondary factors during design.

Switch devices may be implemented using n-channel, p-channel, or bipolar transistors, or junctions within these transistors. The gate lengths and spacings can be increased to provide better protection from damage.

Many variations of IC semiconductor manufacturing processes are possible. Various materials may be used. Additional process steps may be added, such as for additional metal layers or for other transistor types or modification of standard complementary metal-oxide-semiconductor (CMOS) transistors when the transistors are integrated onto a larger device. While complementary metal-oxide-semiconductor (CMOS) transistors have been described, other kinds of transistors could be substituted for some embodiments, such as n-channel only, p-channel only when the output swing can be limited, or various alternate transistor technologies such as Bipolar or BiCMOS. The CMOS process may be a Fin Field-Effect Transistor (FinFET) process.

Terms such as up, down, above, under, horizontal, vertical, inside, outside, are relative and depend on the viewpoint and are not meant to limit the invention to a particular perspective. Devices may be rotated so that vertical is horizontal and horizontal is vertical, so these terms are viewer dependent.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. An active inductor circuit comprising:
a mutual inductor device having primary windings between primary terminals and having secondary windings between secondary terminals, wherein the primary windings and the secondary windings are electrically isolated from each other and are magnetically coupled together by mutual inductance generated by currents flowing through the primary windings and the secondary windings;
an op amp having a first input connected to a first of the secondary terminals;
a ground resistor connected between a second of the secondary terminals and a second input of the op amp;
a feedback device connected between an output of the op amp and the second input of the op amp;
a modulation network connected between the output of the op amp and the first input of the op amp;
a switch in the modulation network, the switch modulating a secondary current flowing through the secondary windings of the mutual inductor device,
the modulation network modulating an output current generated at the output of the op amp and applying a modulated current to the second of the secondary terminals of the mutual inductor device;
wherein when the switch is in a first state, the secondary current has a first current value;
wherein when the switch is in a second state, the secondary current has a second current value that is greater than the first current value;
wherein when the switch is in the first state, the secondary current flowing through the secondary windings increases a primary equivalent inductance value of the first windings by mutual inductance through the mutual inductor device;
wherein when the switch is in the second state and the secondary current has the second current value, the primary equivalent inductance value is greater than the primary equivalent inductance value when the switch is in the first state,
whereby the primary equivalent inductance value is switched between two values by the switch that modulates the secondary current.

2. The active inductor circuit of claim 1 wherein the mutual inductor device is a transformer;
wherein a primary current and the secondary current flow in a same direction within the transformer.

3. The active inductor circuit of claim 2 wherein the feedback device is a capacitor;
wherein the modulation network further comprises a positive resistor connected in series with the switch between the output of the op amp and the first input of the op amp.

4. The active inductor circuit of claim 2 wherein the feedback device is a resistor;
wherein the modulation network further comprises a positive inductor connected in series with the switch between the output of the op amp and the first input of the op amp.

5. The active inductor circuit of claim 2 wherein the switch is a diode.

6. The active inductor circuit of claim 3 further comprising:
a steady-state detector that compares a primary output voltage generated by the primary current flowing through the primary windings of the mutual inductor device to a predetermined voltage range and activates a switch signal when the primary output voltage is within the predetermined voltage range;
wherein the switch signal from the steady-state detector is applied to open and close the switch.

7. The active inductor circuit of claim 6 wherein the switch is a transistor having a control gate that receives the switch signal from the steady-state detector;
wherein the transistor is a bipolar transistor or a Metal Oxide Semiconductor Field Effect Transistor (MOSFET).

8. The active inductor circuit of claim 7 further comprising:
a first power transistor connected in series with the first windings of the mutual inductor device to generate the primary output voltage, the first power transistor having a gate driven by a controller that switches the first power transistor on and off at a selected switching frequency that creates a ripple in the primary output voltage;

wherein the ripple is reduced by the switch closing to increase the secondary current and to increase the primary equivalent inductance value;

wherein the primary equivalent inductance value increases when the steady-state detector detects that the primary output voltage is outside the predetermined voltage range and the switch is opened to reduce the secondary current;

whereby transients are suppressed by a lower primary equivalent inductance value when a transient is detected while ripple is reduced by a higher primary equivalent inductance value when the transient is not detected at steady-state.

9. The active inductor circuit of claim 8 wherein the first power transistor is connected in series with the first windings of the mutual inductor device between an input power voltage and an output capacitance having the primary output voltage;

further comprising:

a second power transistor connected between a primary terminal of the mutual inductor device and a primary ground, and having a gate driven by the controller;

wherein the controller generates non-overlapping gate signals to the first power transistor and to the second power transistor to prevent both the first and second power transistor from being on at a same time;

wherein the active inductor circuit modulates primary inductance of a Switched-Mode Power Supply (SMPS).

10. The active inductor circuit of claim 9 wherein the switch is open when the switch is in the first state to block current flow;

wherein the switch is closed when the switch is in the second state to conduct current;

wherein the switch turns off the secondary current when the switch is open.

11. The active inductor circuit of claim 10 wherein the primary equivalent inductance value when the switch is closed is at least double the primary equivalent inductance value when the switch is open;

wherein equivalent inductance in the primary windings is doubled by the modulation network closing the switch.

12. The active inductor circuit of claim 9 further comprising:

a switch shunt resistor connected in parallel with the switch;

wherein the secondary current continues to flow when the switch is open.

13. A variable equivalent inductance circuit comprising:

a transformer having a primary path and a secondary path that are electrically isolated from each other and magnetically coupled together by mutual inductance;

wherein a primary current flows through the primary path of the transformer to charge an output capacitance to generate a primary output voltage;

wherein a secondary current flows through the secondary path from an input secondary terminal to an output secondary terminal;

wherein the primary current flows in a same direction as the secondary current within the transformer;

an op amp having an inverting input and a non-inverting input and an output;

a first resistor connected between the output secondary terminal of the transformer and the inverting input of the op amp;

a feedback impedance device connected between the inverting input of the op amp and the output of the op amp;

a switch and a second impedance device connected in series between the output of the op amp and the non-inverting input of the op amp;

wherein the non-inverting input of the op amp is connected to the input secondary terminal of the transformer.

14. The variable equivalent inductance circuit of claim 13 wherein the second impedance device is a resistor;

wherein the feedback impedance device is a capacitor.

15. The variable equivalent inductance circuit of claim 14 wherein the op amp is powered by an upper supply voltage and a lower supply voltage;

wherein a midpoint voltage between the upper supply voltage and the lower supply voltage is connected to the output secondary terminal of the transformer.

16. The variable equivalent inductance circuit of claim 15 further comprising:

a steady-state detector that compares the primary output voltage to a voltage limit and activates a switch signal when the primary output voltage does not exceed the voltage limit;

wherein the switch signal closes the switch to increase current flow through the second impedance device and increase a primary inductance along the primary path through the transformer when the switch signal is activated when small voltage ripples occur on the primary output voltage that are less than the voltage limit;

wherein the switch signal opens the switch to decrease current flow through the second impedance device and decrease the primary inductance along the primary path through the transformer when the switch signal is not activated when large voltage transients occur on the primary output voltage that are more than the voltage limit, whereby the switch closing causes the primary inductance to increase during steady-state to reduce ripples and the switch opens to cause the primary inductance to decrease during transients to increase bandwidth and reduce transient response time.

17. The variable equivalent inductance circuit of claim 16 wherein the switch is a Metal Oxide Semiconductor Field Effect Transistor (MOSFET) having a gate receiving the switch signal from the steady-state detector or the switch is a bipolar transistor having a base receiving the switch signal from the steady-state detector.

18. The variable equivalent inductance circuit of claim 16 further comprising:

a controller that generates a first gate signal and a second gate signal that are non-overlapping and switching at a frequency that is within an order of a magnitude of 100 kHz;

a power voltage input;

a first power transistor having a gate receiving the first gate signal, connected between the power voltage input and an input primary terminal to the primary path of the transformer;

a second power transistor having a gate receiving the second gate signal, connected between the input primary terminal to the primary path of the transformer and a primary ground;

wherein an output terminal of the primary path of the transformer is connected to the output capacitance to generate the primary output voltage;

wherein the first power transistor, the second power transistor, and the primary path of the transformer form a Buck converter Switched-Mode Power Supply (SMPS).

19. The variable equivalent inductance circuit of claim 17 further comprising:
a controller that generates a first gate signal and a second gate signal that are non-overlapping and switching at a frequency that is within an order of a magnitude of 100 kHz;
a power voltage input;
a first power transistor having a gate receiving the first gate signal, connected between the output primary terminal of the primary path of the transformer and the output capacitance that generates the primary output voltage;
a second power transistor having a gate receiving the second gate signal, connected between the input primary terminal to the primary path of the transformer and a primary ground;
wherein an input terminal of the primary path of the transformer is connected to the power voltage input;
wherein the first power transistor, the second power transistor, and the primary path of the transformer form a Boost converter Switched-Mode Power Supply (SMPS).

20. A switchable-inductance power-supply circuit comprising:
a transformer having a primary path and a secondary path that are electrically isolated from each other and magnetically coupled together by mutual inductance;
wherein a primary current flows through the primary path of the transformer to charge an output capacitance to generate a primary output voltage;
wherein a secondary current flows through the secondary path from an input secondary terminal to an output secondary terminal;
wherein the primary current flows in a same direction as the secondary current within the transformer;
an op amp having an inverting input and a non-inverting input and an output;
a first resistor connected between the output secondary terminal of the transformer and the inverting input of the op amp;
a feedback capacitor connected between the inverting input of the op amp and the output of the op amp;
a switch transistor and a second resistor connected in series between the output of the op amp and the non-inverting input of the op amp;
wherein the non-inverting input of the op amp is connected to the input secondary terminal of the transformer;
a controller that generates a first gate signal and a second gate signal that are non-overlapping and switching at a selected frequency;
a power voltage input;
a first power transistor having a gate receiving the first gate signal, connected between the power voltage input and an input primary terminal to the primary path of the transformer;
a second power transistor having a gate receiving the second gate signal, connected between the input primary terminal to the primary path of the transformer and a primary ground;
wherein an output terminal of the primary path of the transformer is connected to the output capacitance to generate the primary output voltage;
wherein the first power transistor, the second power transistor, and the primary path of the transformer form a Buck converter Switched-Mode Power Supply (SMPS);
a steady-state detector that compares the primary output voltage to a voltage limit and activates a switch signal to the switch transistor when the primary output voltage does not exceed the voltage limit;
wherein the switch signal closes the switch transistor to increase current flow through the second impedance device and increase primary inductance along the primary path through the transformer when the switch signal is activated when small voltage ripples occur on the primary output voltage that are less than the voltage limit;
wherein the switch signal opens the switch transistor to decrease current flow through the second impedance device and decrease primary inductance along the primary path through the transformer when the switch signal is not activated when large voltage transients occur on the primary output voltage that are more than the voltage limit;
whereby the switch transistor closing causes primary inductance to increase during steady-state to reduce ripples and the switch transistor opens to cause the primary inductance to decrease during transients to increase bandwidth and reduce transient response time.

* * * * *